United States Patent
Roth et al.

(10) Patent No.: US 9,623,720 B2
(45) Date of Patent: Apr. 18, 2017

(54) VISCOUS COOLANT HEATER WITH VARIABLE COOLANT PUMP DRIVE

(71) Applicant: BorgWarner Inc.

(72) Inventors: David B. Roth, Groton, NY (US); Olaf E. Weber, Bloomfield Hills, MI (US)

(73) Assignee: BorgWarner Inc., Auburn Hills, MI (US)

( * ) Notice: Subject to any disclaimer, the term of this patent is extended or adjusted under 35 U.S.C. 154(b) by 831 days.

(21) Appl. No.: 13/920,016

(22) Filed: Jun. 17, 2013

(65) Prior Publication Data

US 2013/0270352 A1 Oct. 17, 2013

Related U.S. Application Data

(63) Continuation of application No. 12/526,961, filed as application No. PCT/US2008/054037 on Feb. 14, 2008, now Pat. No. 8,464,963.

(60) Provisional application No. 60/890,114, filed on Feb. 15, 2007.

(51) Int. Cl.
| | |
|---|---|
| *B60H 1/22* | (2006.01) |
| *B60H 1/03* | (2006.01) |
| *F24J 3/00* | (2006.01) |
| *B60H 1/00* | (2006.01) |
| *B60H 1/04* | (2006.01) |
| *F02N 99/00* | (2010.01) |
| *B60H 1/14* | (2006.01) |

(52) U.S. Cl.
CPC ......... *B60H 1/00314* (2013.01); *B60H 1/038* (2013.01); *B60H 1/22* (2013.01); *F24J 3/003* (2013.01); *B60H 2001/146* (2013.01)

(58) Field of Classification Search
CPC ...... B60H 1/038; B60H 1/00314; B60H 1/22; B60H 2001/146; F24J 3/003
USPC .......... 237/8 A, 8 R, 12.3 B, 12.3 R, 19, 34; 122/1 C, 3, 11, 26; 123/41.44, 142.5 R; 137/625.48, 878, 881; 165/165; 192/58.41, 54.3, 58.4, 12 A, 216, 48.1, 192/58.6, 58.63, 82 T; 415/1, 55.1
See application file for complete search history.

(56) References Cited

U.S. PATENT DOCUMENTS

| | | | |
|---|---|---|---|
| 1,126,354 A | | 1/1915 | Becker |
| 1,238,447 A | * | 8/1917 | Severy .................... F16D 35/00 188/264 D |
| 1,249,660 A | * | 12/1917 | Olson ................. F16H 61/0262 192/12 A |

(Continued)

FOREIGN PATENT DOCUMENTS

| | | | |
|---|---|---|---|
| CN | 1523246 A | 8/2004 | |
| DE | 3147468 A1 * | 12/1982 | ............. B60H 1/038 |

(Continued)

*Primary Examiner* — Gregory Huson
*Assistant Examiner* — Daniel E Namay
(74) *Attorney, Agent, or Firm* — Harness, Dickey & Pierce, P.L.C.; John A. Artz PC

(57) ABSTRACT

A vehicle heating system having a first viscous clutch and a pump and viscous clutch mechanism. The first viscous clutch has a first clutch input member. The pump and viscous clutch mechanism has a pump and a second viscous clutch. The pump includes a pump input member, while the second viscous clutch includes a second clutch input member. One of the pump input member and the second clutch input member is drivingly coupled to a portion of the first viscous clutch.

19 Claims, 3 Drawing Sheets

(56) References Cited

U.S. PATENT DOCUMENTS

| | | | |
|---|---|---|---|
| 1,298,990 A * | 4/1919 | Mason | F16H 41/26 192/12 A |
| 1,650,612 A | 11/1927 | Denniston | |
| 2,428,005 A * | 9/1947 | Bennett | G01L 3/20 188/264 D |
| 2,573,065 A | 10/1951 | Salemme | |
| 2,603,103 A | 7/1952 | Sohon et al. | |
| 2,672,954 A * | 3/1954 | Bennett | G01L 3/20 165/47 |
| 2,695,675 A * | 11/1954 | Frye | B60K 17/02 180/336 |
| 2,750,009 A * | 6/1956 | Pohl | F16D 57/04 188/264 P |
| 3,403,763 A | 10/1968 | Hilpert et al. | |
| 3,720,372 A * | 3/1973 | Jacobs | B60H 1/038 122/26 |
| 3,860,097 A | 1/1975 | Braschler et al. | |
| 3,919,844 A | 11/1975 | Elderton | |
| 4,043,434 A | 8/1977 | Braschler | |
| 4,201,050 A | 5/1980 | Nixel | |
| 4,276,970 A | 7/1981 | Herrmann et al. | |
| 4,338,524 A | 7/1982 | Hatz et al. | |
| 4,678,400 A * | 7/1987 | Kuboyama | F24J 3/003 126/247 |
| 4,682,679 A * | 7/1987 | Elmer | F16D 35/02 192/58.63 |
| 4,733,635 A | 3/1988 | Menard et al. | |
| 4,773,513 A * | 9/1988 | Herrmann | B60T 1/087 188/269 |
| 5,176,235 A | 1/1993 | Williams | |
| 5,718,375 A | 2/1998 | Gerard | |
| 5,752,474 A * | 5/1998 | Ban | F01P 3/20 122/26 |
| 5,765,545 A | 6/1998 | Ban et al. | |
| 5,775,583 A | 7/1998 | Braatz et al. | |
| 5,794,588 A | 8/1998 | Vogelsang et al. | |
| 5,897,056 A | 4/1999 | Morikawa et al. | |
| 5,931,380 A | 8/1999 | Aoki et al. | |
| 6,144,020 A * | 11/2000 | Usui | B60H 1/22 219/628 |
| 6,547,153 B1 | 4/2003 | Davis | |
| 6,558,112 B2 * | 5/2003 | Moroi | B60H 1/03 415/1 |
| 6,644,933 B2 | 11/2003 | Light et al. | |
| 6,725,812 B1 | 4/2004 | Scott | |
| 6,725,813 B1 | 4/2004 | Boyer | |
| 6,868,809 B1 | 3/2005 | Robb | |
| 7,040,545 B2 * | 5/2006 | Tilly | B60H 1/038 165/41 |
| 7,178,648 B2 | 2/2007 | Barnum et al. | |
| RE39,765 E | 8/2007 | Robb | |
| 7,278,524 B2 | 10/2007 | Boyer | |
| 7,628,262 B2 | 12/2009 | Barnum et al. | |
| 7,891,474 B2 | 2/2011 | McDaniel | |
| 8,302,876 B2 * | 11/2012 | Sanger | B60H 1/00314 122/11 |
| 2003/0062036 A1 * | 4/2003 | Augenstein | B60H 1/038 126/247 |
| 2004/0084273 A1 * | 5/2004 | May | F16D 35/024 192/58.61 |
| 2004/0194775 A1 * | 10/2004 | Thoma | F24J 3/003 126/247 |
| 2005/0199207 A1 * | 9/2005 | Augenstein | B60H 1/038 123/142.5 R |
| 2005/0205682 A1 * | 9/2005 | Sanger | B60H 1/00314 237/10 |
| 2006/0174845 A1 * | 8/2006 | Thoma | F24J 3/006 122/26 |
| 2008/0060588 A1 * | 3/2008 | Isopo | F22B 3/06 122/26 |
| 2008/0073174 A1 * | 3/2008 | Taylor | B60H 1/038 192/17 R |
| 2008/0185453 A1 * | 8/2008 | Sanger | B60H 1/00485 237/12.3 B |
| 2008/0245882 A1 * | 10/2008 | Sanger | B60H 1/00485 237/12.3 B |
| 2009/0235914 A1 * | 9/2009 | Derman | F24J 3/003 126/247 |
| 2010/0044450 A1 * | 2/2010 | Roth | F16D 48/06 237/12.3 R |

FOREIGN PATENT DOCUMENTS

| | | | | |
|---|---|---|---|---|
| DE | 3638471 A1 * | 5/1987 | | B60H 1/00492 |
| DE | 19714668 A1 | 10/1997 | | |
| FR | 2592340 A1 * | 7/1987 | | B60H 1/22 |
| GB | 2392237 A | 2/2004 | | |
| JP | 56082618 A * | 7/1981 | | |
| JP | 57163776 A * | 10/1982 | | |
| JP | S63101334 U | 7/1988 | | |
| JP | 02246823 A * | 10/1990 | | |
| JP | 02254010 A * | 10/1990 | | |
| JP | 06257769 A * | 9/1994 | | |
| JP | 09277817 A * | 10/1997 | | |
| JP | DE 19714668 A1 * | 10/1997 | | B60H 1/038 |
| JP | 10006758 A * | 1/1998 | | |
| JP | 10044749 A * | 2/1998 | | |
| JP | H10297265 A | 11/1998 | | |
| JP | 2000038025 A * | 2/2000 | | |
| JP | 2000289446 A | 10/2000 | | |
| JP | 2001333557 A * | 11/2001 | | |
| JP | 2002029250 A * | 1/2002 | | |
| JP | 2002030932 A | 1/2002 | | |
| JP | 2002030932 A * | 1/2002 | | |
| JP | 2002031075 A * | 1/2002 | | |
| RU | 2010988 C1 | 4/1994 | | |

* cited by examiner

VISCOUS COOLANT HEATER WITH VARIABLE COOLANT PUMP DRIVE

CROSS-REFERENCE TO RELATED APPLICATION

This application is a continuation of U.S. patent application Ser. No. 12/526,961 filed Aug. 13, 2009 (now U.S. Pat. No. 8,464,963 issued Jun. 18, 2013), which is a national phase entry of International Patent Application No. PCT/US2008/101136 filed Feb. 14, 2008, which claims the benefit of U.S. Provisional Application No. 60/890,114 filed Feb. 15, 2007.

TECHNICAL FIELD

The present invention relates to supplemental heating systems for vehicles and more particularly to supplemental heating systems particularly for vehicles with diesel engines.

BACKGROUND OF THE INVENTION

There is a demand in vehicles with internal combustion engines for supplemental heat during the warm-up phase that immediately follows a cold-start in cold ambient (winter) conditions. This is particularly true in vehicles with diesel engines since they warm up more slowly than spark-ignition engines. One of the main benefits of rapid warm-up of an engine is improved heater and defroster performance. Also, warm engines run more efficiently and produce lower emissions levels than cold engines.

Additionally, diesel engines have the additional challenge of providing sufficient heat when the vehicle is stuck in a traffic jam in cold ambient conditions. Under some conditions, the engine may not naturally reject sufficient heat to the cooling system to maintain the engine to its set-point. In these cases, supplemental heat may be required long after the cold-start event.

The currently known methods of generating supplemental heat include: (1) electric resistance heating; (2) extra fuel burner and heat exchanger; (3) exhaust system heat exchanger; and (4) viscous heater driven by the engine.

It is known that a direct driven coolant circulation pump in an engine delivers more coolant flow to the engine than is needed at part-throttle or part-load, since the pump is sized for full-throttle or full load at all engine speeds. Since the extra pumping work represents parasitic loss, various systems have been devised to match coolant pump speed to the instantaneous power level rather than just engine speed. Known methods to provide continuously-variable coolant pump speed are: (1) electric motor driven coolant pumps; (2) variable mechanical drives; and (3) variable viscous drives.

Thus, a need exists for improved supplemental heat sources and systems for vehicle engines, particularly for the warmup phases and for diesel engines. Also, a need exists for a variable coolant pump, especially for use in producing supplemental heat for a vehicle.

SUMMARY OF THE INVENTION

The present invention overcomes the above problems and provides an improved supplemental heat system which has particular use for diesel engines in vehicles. The invention includes the functions of a viscous coolant heater (VCH) and a viscous coolant pump drive (VCP) combined in one unit.

The invention provides independent control of the heater output and the percent engagement of the coolant pump from the input power source.

A driven viscous plate that has different viscous clutch faces on each side is provided. One of the sides of the viscous clutch clutches to the engine structure (ground) to generate heat. The other side of the viscous clutch clutches to the coolant pump and varies the pump drive. The two sides are fed and controlled by a valve that can independently vary the supply of viscous fluid from a common reservoir to both sides. The operation of the invention is generally governed by signals from the engine control unit (ECU a/k/a engine computer) and is preferably based on the instantaneous desired supplemental heat and coolant flow.

Other objects and features of the present invention will become apparent when viewed in light of the detailed description of a preferred embodiment when taken in conjunction with the attached drawings and appended claims.

DESCRIPTION OF PREFERRED EMBODIMENTS

Supplementary coolant heaters for vehicles with diesel engines are typically in the range of 2 to 4 KW for peak power and are required to attain rapid heater/defroster performance after a cold start in cold (winter) ambient conditions. For some diesel engines, the continuation of supplemental heat is also required in extended idling conditions in cold ambient conditions.

Coolant pumps for diesel engines are required to pump coolant in proportion to the power generated. The power dissipation requirement for a viscous heater (presumably at idle speed) and the total power transmission load (at peak engine speed) for a viscous pump drive in a vehicle are approximately the same.

For the initial warm-up phase of a diesel engine, the viscous heater must be filled and slipping and the viscous pump clutch must be operating somewhere between the low and high slip conditions. The colder the coolant, the slower the pump may be allowed to spin.

Figure 1:
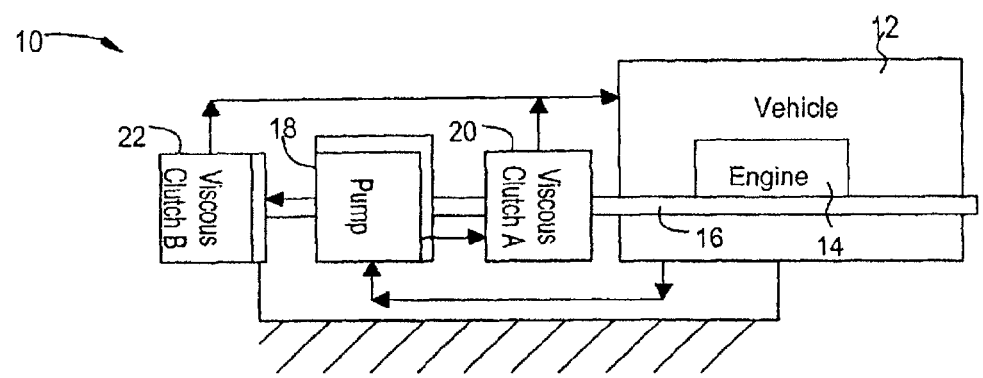
FIG. 1 schematically illustrates one embodiment of the present invention.

One embodiment in accordance with the present invention is shown in FIG. 1. The embodiment is referred to generally by the reference numeral 10 and is utilized with a vehicle 12 having a diesel engine 14. The crankshaft 16 of the engine operates a coolant pump 18. A pair of viscous clutches 20 and 22 are provided on opposite sides of the pump 18.

Shortly after initial startup conditions for the vehicle 12 and to provide some viscous heating, the viscous clutch 20 is filled to provide a maximum coupling with the coolant pump 18. At the same time, viscous clutch 22 is only partially engaged and acts as a brake to slow the speed of the pump. In this manner, both viscous clutches 20 and 22 are slipping and generate heat. The impeller of the pump is only running at a slow speed, but that speed is sufficient to dissipate the heat.

With this embodiment of the invention, it is believed that the required flow for this condition would be close to the full pump speed at idle for a normal coolant pump. This is because most automobile coolant pumps are only marginally large enough for heat/defrost requirements at idle. Also, a viscous driven coolant pump is typically slightly oversized, in order to make up for the maximum viscous clutch slip, which typically is on the order of 2-3 percent.

When supplemental heat is not required, the viscous clutch 22 is emptied and the coolant pump speed is only modulated by the viscous clutch 20.

Figure 2:
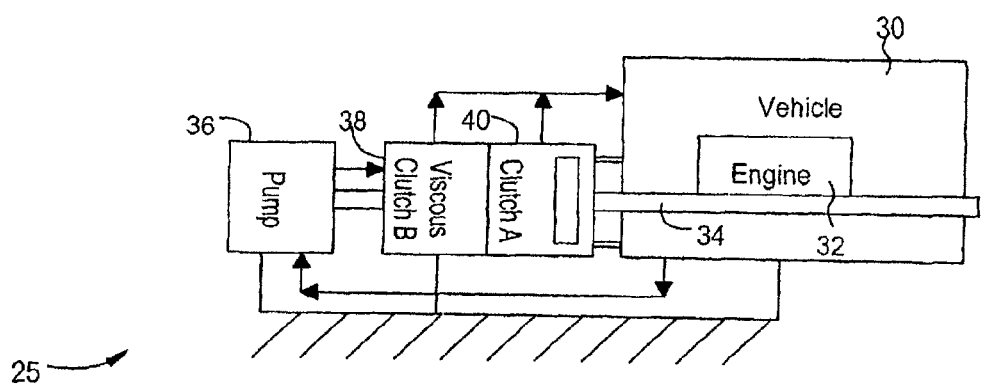
FIG. 2 illustrates another embodiment of the present invention.

Another embodiment of the present invention is shown in FIG. 2 and several steps in its operation are illustrated schematically in FIGS. 3-6. This embodiment is referred to generally by the reference numeral 25. In this embodiment, the coolant flow and the viscous heat are independent.

The vehicle 30 has a diesel engine 32 with a crankshaft 34. The crankshaft 34 operates the coolant pump 36. A two-stage viscous clutch mechanism with viscous clutches 38 and 40 is provided adjacent to the pump 36. Viscous clutch 38 is positioned between the impeller of the pump 36 and the vision viscous clutch 40, while viscous clutch 40 is positioned between the viscous clutch 38 and the engine (ground) 32.

The two clutches are preferably combined in one unit or housing, with a common valve and a common fluid reservoir. Any conventional viscous fluid can be utilized, such as silicone. The fluid valve is selectively operable in a first condition, which permits fluid communication between the reservoir and the viscous clutch 38 while inhibiting fluid communication between the reservoir and the viscous clutch 40, a second condition, which inhibits fluid communication between the reservoir and the viscous clutch 38 while permitting fluid communication between the reservoir and the viscous clutch 40, and a third condition that permits fluid communication with both viscous clutches 38 and 40.

For initial cold startup with the system 25, the pump 36 only has to turn very slowly. Thus, the operating chamber of viscous clutch 38 is empty. At this time, the operating chamber of viscous clutch 40 is full and generates heat while not affecting the pump input speed. As heat is generated, the pump 36 can be brought up to speed to circulate the heated coolant. During this time, heat will be generated primarily by viscous clutch 40 and also by the slip in the coolant pump drive viscous clutch 38.

With system 25, independent control of the coolant pump speed in the viscous heater is present during the warm-up phase of the engine 32. At normal temperatures, when no supplemental heat is required, viscous clutch 40 will have an empty operating chamber and viscous clutch 38 will be modulating the speed of the pump 36.

With this embodiment, two viscous mechanisms are combined in one unit. A single controller apportions the silicone fluid (or working fluid) to the appropriate side for the requisite supplemental heat generation.

Figure 3:
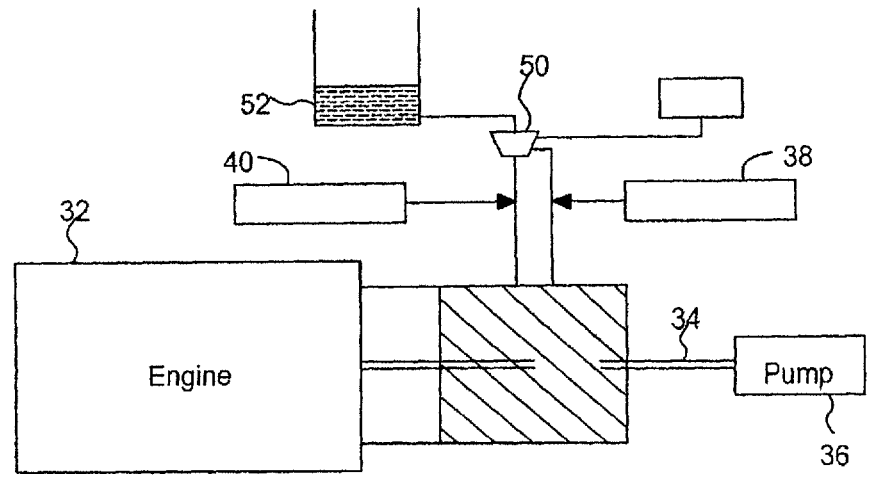
FIG. 3 illustrates one step in the use of an embodiment of the present invention.

As shown in FIG. 3, valve member 50 is positioned between the working fluid reservoir 52 and the two viscous clutches 38 and 40. The valve member 50 selectively directs the working fluid to one or both of the clutches. The operation of system 25 is shown schematically in FIGS. 4-6.

The fluid reservoir 52 is connected through valve 50 to the viscous clutches 38 and 40. The input member 60 of the two combined clutch mechanisms 38 and 40 is driven at input speed by the crankshaft 34 of the engine 32. The driven member of the viscous clutch 38 is indicated by reference numeral 62 while the driven member of viscous clutch 40 is indicated by reference numeral 64. The coolant pump 36 is driven by the driven member 62 of the viscous clutch 38. The heat generated by the system 25 is indicated by the "Q Out" arrows 70. The portion 66 of viscous clutch 40 is fixed and does not rotate. There is a very close tolerance between the other diameter of the input member 60 and the housing member 68. This close tolerance is referred to by reference numeral 72.

Figure 4:
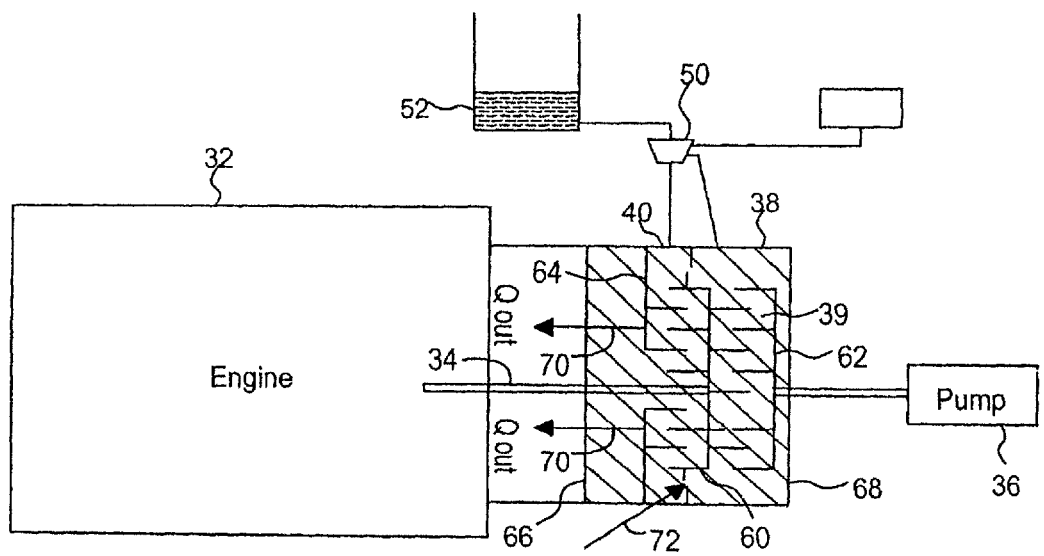
FIGS. 4-6 illustrate other steps in the performance of the invention in accordance with one of the embodiments.

As shown in FIG. 4, when the working chambers of both viscous clutches are full, the engine and pump turn at the same speed.

Figure 5:
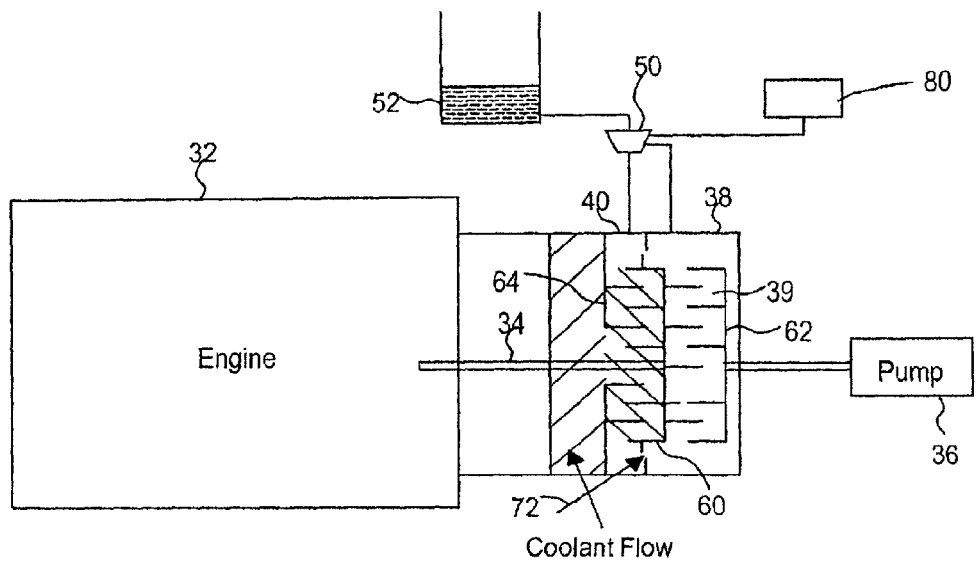

FIG. 5 schematically shows the situation where the heater mode is in the fully "on" condition. The valve 50 is operated by the engine control unit (ECU) or engine computer 80 to allow silicone fluid to only enter the space between the input member 60 and the rotating output member 64 of the viscous clutch member 40. At this point, the coolant pump is not operating and there is a full generation of heat provided from the viscous clutch 40.

Figure 6:
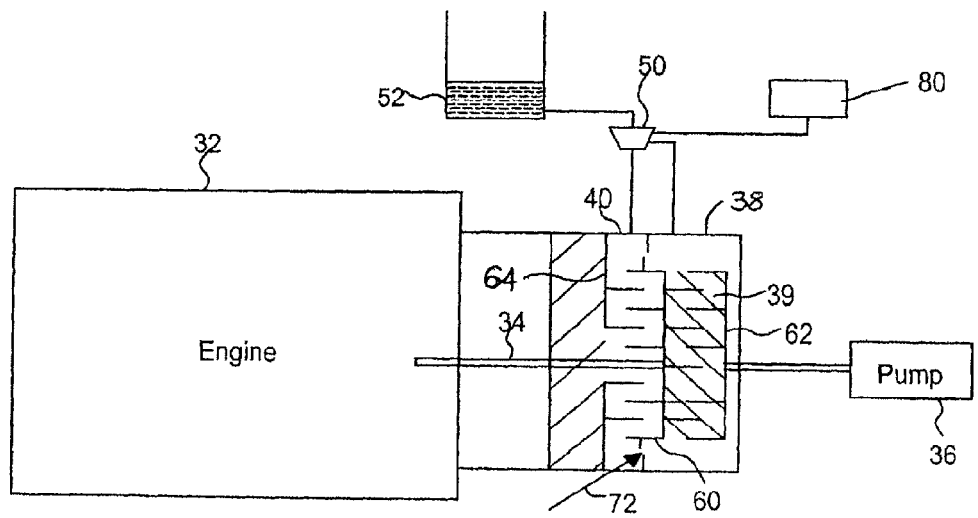

The situation when the heater is "off" is shown in FIG. 6. The valve member 50 has been operated by the electronic control unit 80 to provide fluid to the working chamber of viscous clutch 38. The working chamber is referred to by the reference numeral 39 and is positioned between the input member 60 and the output member 62. At this point, the pump member 36 will be in a fully "on" condition. Also, the working chamber of viscous clutch 40 is empty and the speed of the coolant pump 36 is being modulated and regulated solely by the viscous clutch 38. As a result, during the warm-up phase, independent control of the coolant pump speed in the viscous heater is achieved.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A vehicle heating system comprising:
 a first clutch having a first clutch input member, the first clutch being a viscous clutch; and
 a pump and clutch mechanism having a pump and a second clutch, the pump having a pump input member, the second clutch having a second clutch input member, wherein one of the pump input member and the second clutch input member is drivingly coupled to a portion of the first clutch.

2. The vehicle heating system of claim 1, wherein the second clutch input member is coupled to the pump input member for common rotation.

3. The vehicle heating system of claim 1, wherein the second clutch has a clutch output member that is coupled to the pump input member for common rotation.

4. The vehicle heating system of claim 1, wherein the second clutch is a viscous clutch.

5. The vehicle heating system of claim 4, further comprising a reservoir that is coupled to the first clutch and the second clutch.

6. The vehicle heating system of claim 5, further comprising a valve that is operable in a first condition that permits fluid communication between the first viscous clutch and the reservoir and inhibits fluid communication between the second viscous clutch and the reservoir.

7. The vehicle heating system of claim 5, further comprising a valve that is operable in a first condition that inhibits fluid communication between the first clutch and the reservoir and permits fluid communication between the second clutch and the reservoir.

8. The vehicle heating system of claim 7, wherein the valve is further operable in a second condition that permits fluid communication between the first clutch and the reservoir and inhibits fluid communication between the second clutch and the reservoir.

9. The vehicle heating system of claim 1, wherein the first and second clutches are in fluid communication with the pump.

10. The vehicle heating system of claim 9, wherein the pump has a first outlet and a second outlet, wherein the first clutch is in fluid connection with the first outlet and wherein the second clutch is in fluid connection with the second outlet.

11. The vehicle heating system of claim 1, wherein the first and second clutches are disposed in a common housing.

12. The vehicle heating system of claim 11, wherein the second clutch input member is coupled for rotation with the first clutch input member.

13. The vehicle heating system of claim 12, wherein the first clutch input member comprises a first clutch face that is formed on a first axial side of a disk and wherein the second clutch input member comprises a second clutch face that is formed on a second axial side of the disk that is opposite the first axial side.

14. The vehicle heating system of claim 11, wherein the first clutch input is rotatable about an axis and has a first clutch face, wherein the first clutch has a disk with a second clutch face that is adjacent the first clutch face, and wherein the disk does not rotate about the axis.

15. A vehicle heating system comprising an assembly with a single input shaft, a variable speed coolant pump and a heater, the single input shaft providing rotary power directly to at least one of the variable speed coolant pump and the heater, the heater being a first rotary device that is configured to generate shear forces in a first viscous fluid to generate heat, the variable speed pump being configured to produce a first flow of a coolant that is circulated through the first rotary device, wherein the variable speed coolant pump and the heater are drivingly coupled such that all rotary power input to the assembly for driving both the variable speed coolant pump and the heater is transmitted solely through the single input shaft.

16. The vehicle heating system of claim 15, wherein the variable speed coolant pump comprises a second rotary device that is configured to generate shear forces in a second viscous fluid to transmit rotary power from an input portion of the second rotary device to an output portion of the second rotary device.

17. The vehicle heating system of claim 16, wherein the single input shaft drives an input portion of the first rotary device and the input portion of the second rotary device.

18. The vehicle heating system of claim 16, wherein the first flow of the coolant that is circulated through the first rotary device is also circulated through the second rotary device.

19. The vehicle heating system of claim 16, wherein the variable speed pump is also configured to produce a second flow of a coolant that is circulated through the second rotary device but not the first rotary device.

* * * * *